Dec. 10, 1929.    H. E. WEBER    1,738,857
STEERING GEAR STABILIZER
Filed June 11, 1928
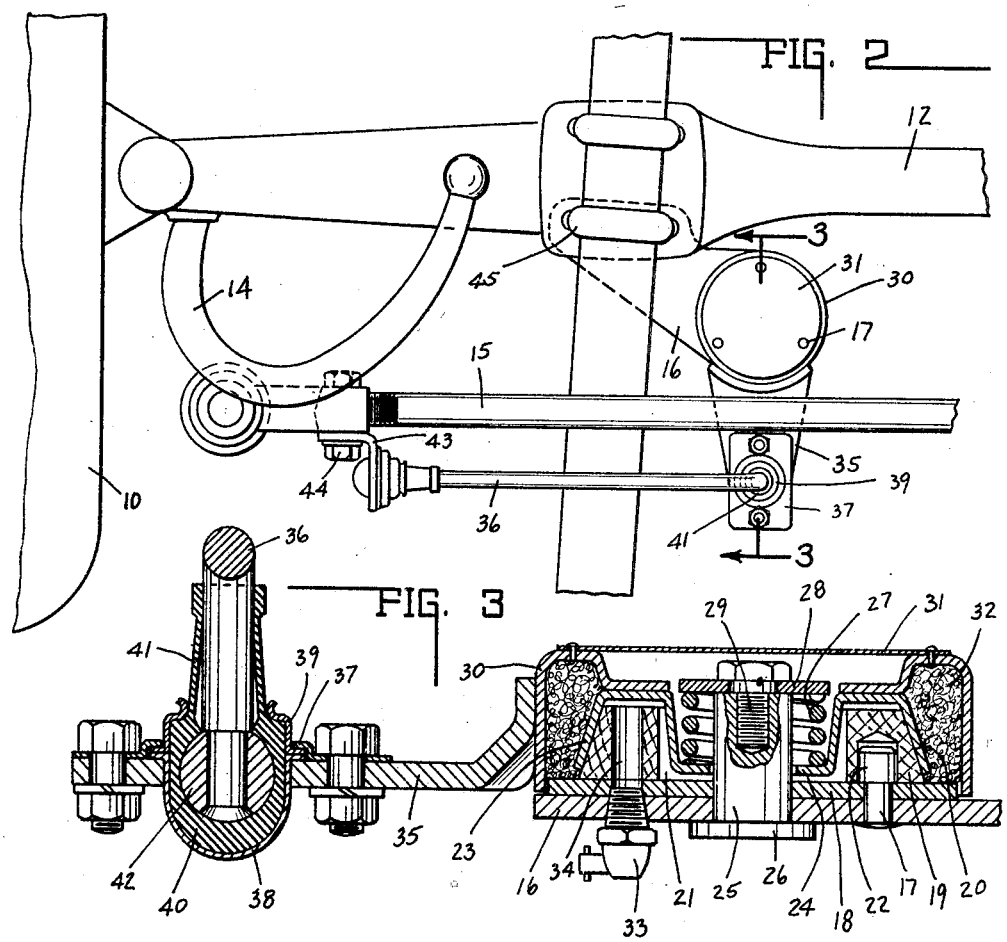
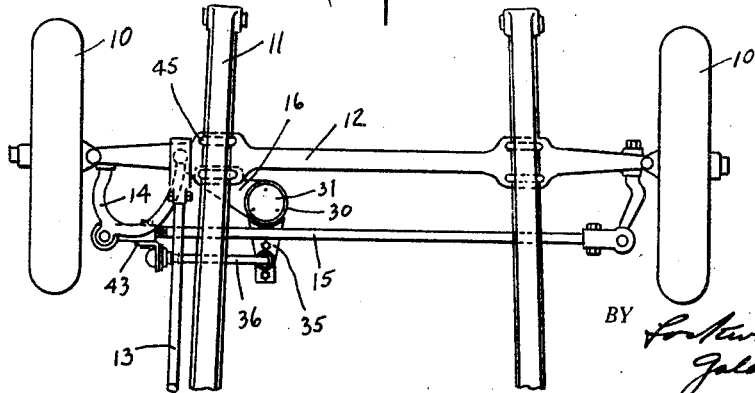
INVENTOR.
HENRY E. WEBER.
BY
ATTORNEYS.

Patented Dec. 10, 1929

1,738,857

UNITED STATES PATENT OFFICE

HENRY E. WEBER, OF INDIANAPOLIS, INDIANA, ASSIGNOR, BY MESNE ASSIGNMENTS, TO WILLIAM C. SWEEZY, OF INDIANAPOLIS, INDIANA

STEERING-GEAR STABILIZER

Application filed June 11, 1928. Serial No. 284,358.

This invention relates to a stabilizer attachment for vehicles, and particularly automobiles employed for the purpose of preventing shimmying of the front wheels.

The vibratory action or shimmying of the front wheels is well known and understood to be dangerous and damaging to the vehicle as well as hazardous in the control thereof. Such shimmying or vibration may be prevented by a very slight resistance thereto if applied at the beginning of the movement and before the momentum thereof has been built up.

It is the object of this invention to provide a friction device which will be negligible and unnoticed in the manual control of the steering mechanism, but which will be sufficient to resist and dampen the slight shimmy movement before it is built up and thereby prevent its occurrence.

The principal feature of the invention resides in the provision of a friction head secured to the front axle of the vehicle and suitably connected with the steering mechanism, preferably at one end of the tie rod. The friction head comprises a pair of friction members adjustably held in frictional engagement under spring tension, whereby one of said members will be held stationary upon the axle, and the other member may be rotated relative thereto by a rod having universal connection therewith and with the steering apparatus.

Another feature of the invention resides in the conical form of the friction elements, whereby a wedging action will be imparted to the friction surfaces thereof by an adjustable compression spring, said surfaces being capable of lubrication by forcing a film of lubricant therebetween against the tension of said spring.

Another feature of the invention resides in the universal connection of the rod joining one of said members to the steering apparatus.

A still further feature of the invention resides in the means for anchoring the friction head to the axle by means of the spring shackles.

The full nature of the invention will be understood from the accompanying drawings and the following description and claim:

In the drawings, Figure 1 is a plan view showing the front portion of the running gear of a vehicle with the attachment mounted thereon. Fig. 2 is an enlarged plan view of the attachment. Fig. 3 is an enlarged sectional view taken on the line 3—3 of Fig. 2.

In the drawings there is shown that portion of a vehicle comprising the steering wheels 10, front springs 11, front axle 12, steering rod 13, goose neck connection with the steering knuckles 14, and tie rod 15.

The friction head comprises an anchor plate 16 to which is secured by the rivets 17 a base plate 18. Fixedly held to the base plate there is a friction element 19 which comprises an annular block of impregnated wood provided with conically-shaped peripheral friction surfaces indicated at 20 and an inlet port or opening 21. The rivets 17 extend into suitable shallow ports formed therein and are provided with the heads 22 positioned therein so as to maintain the element 19 stationary with respect to the anchor plate and base. A second friction element, in the form of a metal cap 23, is mounted over the element 19 so that the side flanges thereof extend downwardly over the friction surfaces 20 in frictional engagement therewith. The central portion of said cap indicated at 24 extends downwardly in the opening 21, through which a stud 25 extends. Said stud is provided with a head 26 bearing against the underside of the anchor plate 16 and is surrounded by a compression spring 27 which exerts a pressure between the portion 24 of the cap 23 and a disk 28 which is adjustably secured on the stud by a headed bolt 29. Thus the two friction elements 19 and 23 are held in frictional engagement with respect to the surface 20 under the tension of the spring 27. The frictional resistance between said elements may be varied and controlled by the adjustment of the bolt 29 which varies the spring tension under which said elements are held in engagement.

An annular cover 30 may be secured in any suitable manner to the friction element 23, such as by spot welding or the like, said cover having flanges extending downwardly to embrace the peripheral edge of the base plate 18 adjacent the anchor plate 16 so that the operating mechanism will be completely housed thereby and a disk 31 secured over the top thereof. Suitable packing 32 is mounted intermediate the friction elements and housing for protecting the friction surfaces from foreign matter and preventing leakage of lubricant.

The friction surfaces are lubricated through the medium of the lubricant fitting 23 which communicates with the port 24 extending upwardly through the element 19. Thus upon sufficient pressure being exerted, upon lubricant being forced therein, a film of lubricant will be forced between the friction surfaces against the tension of the spring 27.

Connected with the housing 30 there is an arm 35 provided at its outer end with an aperture into which the head of a connecting rod 36 extends. Said head is held in position by a plate 37 which is bolted to the arm 35. The head is adapted to provide a universal connection between the rod and arm which comprises a partial spherical cup 38 and its associated collar 39 for securing therein a rubber bearing or socket 40 provided with a neck 41 embracing the adjacent portion of the rod. The end of the rod is provided with a ball 42 which is embraced by the rubber socket so as to be cushioned and protected thereby while having a limited universal movement within the collar 39. The rubber neck portion 41 resiliently contacts with the rod for sealing the joint and protecting the same. The other end of the rod 36 is similarly connected by a universal mounting to an angle plate 43, which plate is rigidly secured by a bolt and nut 44 to the end of the tie rod 15. The anchor plate 16 is similarly secured rigidly to the underside of the axle, between the axle and spring, by means of the spring clips 45, as illustrated in Fig. 2.

From the foregoing, it will be noted that upon the wheels having a tendency to shimmy, the movement would be imparted to the tie rod 15 and immediately resisted and dampened by the frictional resistance of the friction head so that no substantial shimmy action can be built up by reason thereof.

The invention claimed is:

The combination with a vehicle having a front axle, steering wheels mounted thereon, and steering apparatus therefor, of a shimmy-resisting attachment including an impregnated wooden friction element having an annular conically-shaped friction surface, a corresponding conically-shaped friction element adapted to embrace said conical surface and frictionally engaging the same, a compression spring for yieldingly forcing said surfaces into frictional engagement with each other, means for securing one of said elements to the front axle, means for securing the other of said elements to the steering mechanism, and means for introducing lubricant between the frictional surfaces of said elements for forcing a film of lubricant therebetween against the tension of said spring.

In witness whereof, I have hereunto affixed my signature.

HENRY E. WEBER.